July 19, 1932.   L. E. LUBBERS   1,867,670
FIFTH WHEEL
Filed June 18, 1931   3 Sheets-Sheet 1
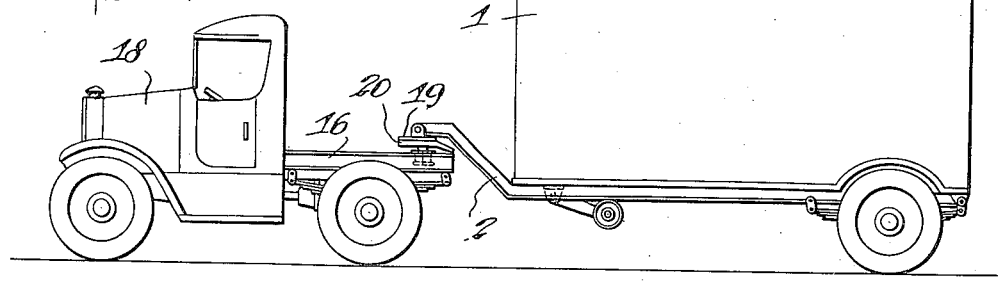
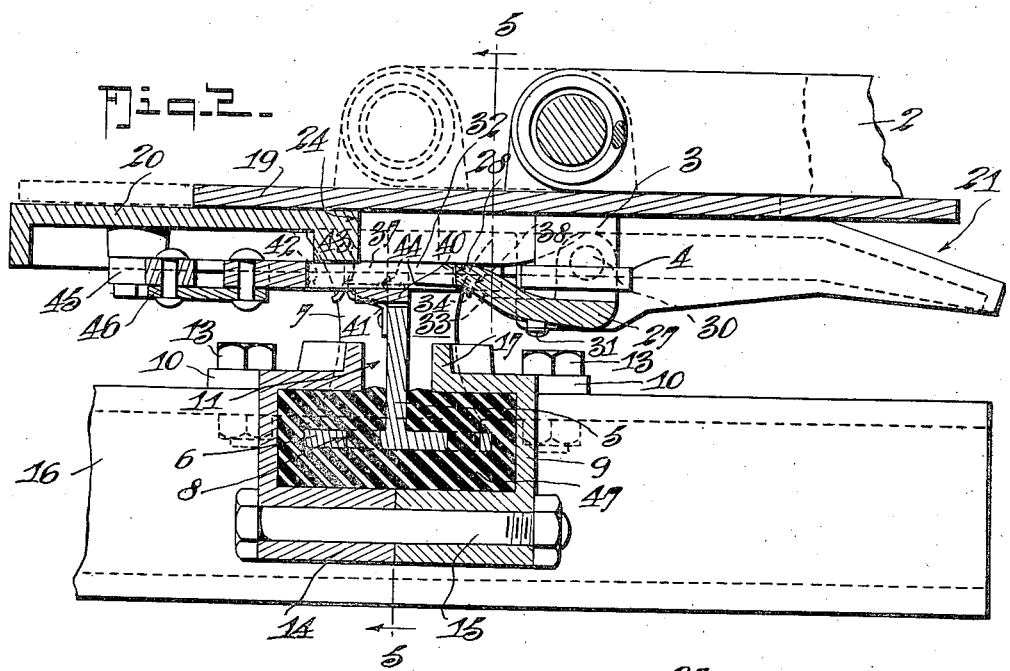
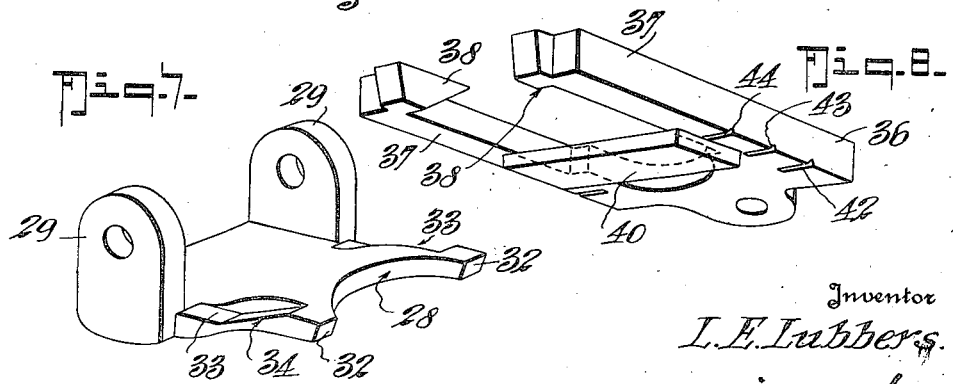
Inventor
L. E. Lubbers
By Albert B. Dutwich
Attorney

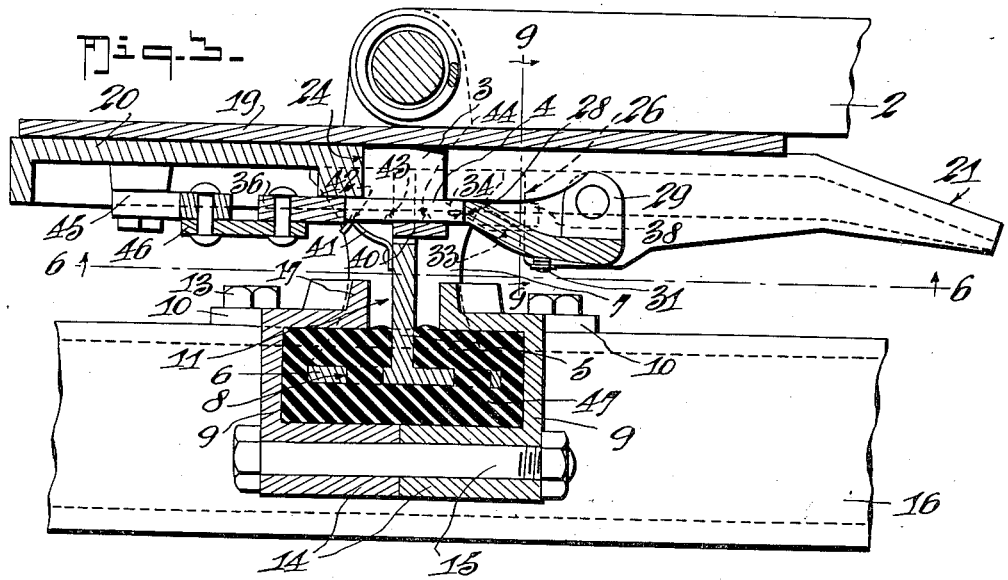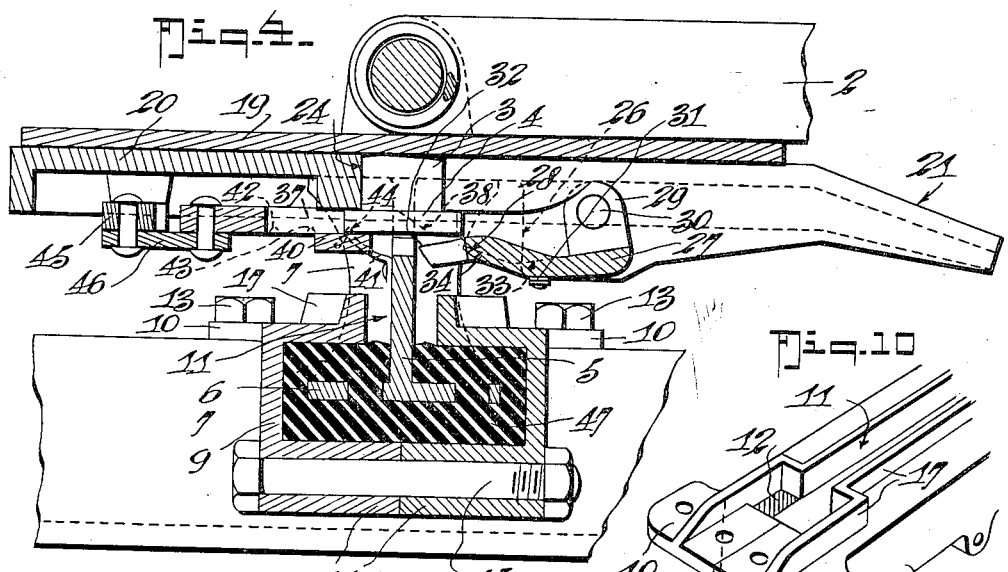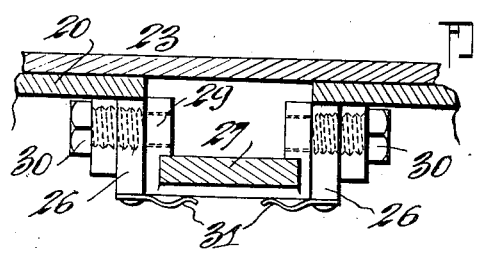

July 19, 1932.　　　　L. E. LUBBERS　　　　1,867,670
FIFTH WHEEL
Filed June 18, 1931　　　3 Sheets-Sheet 3
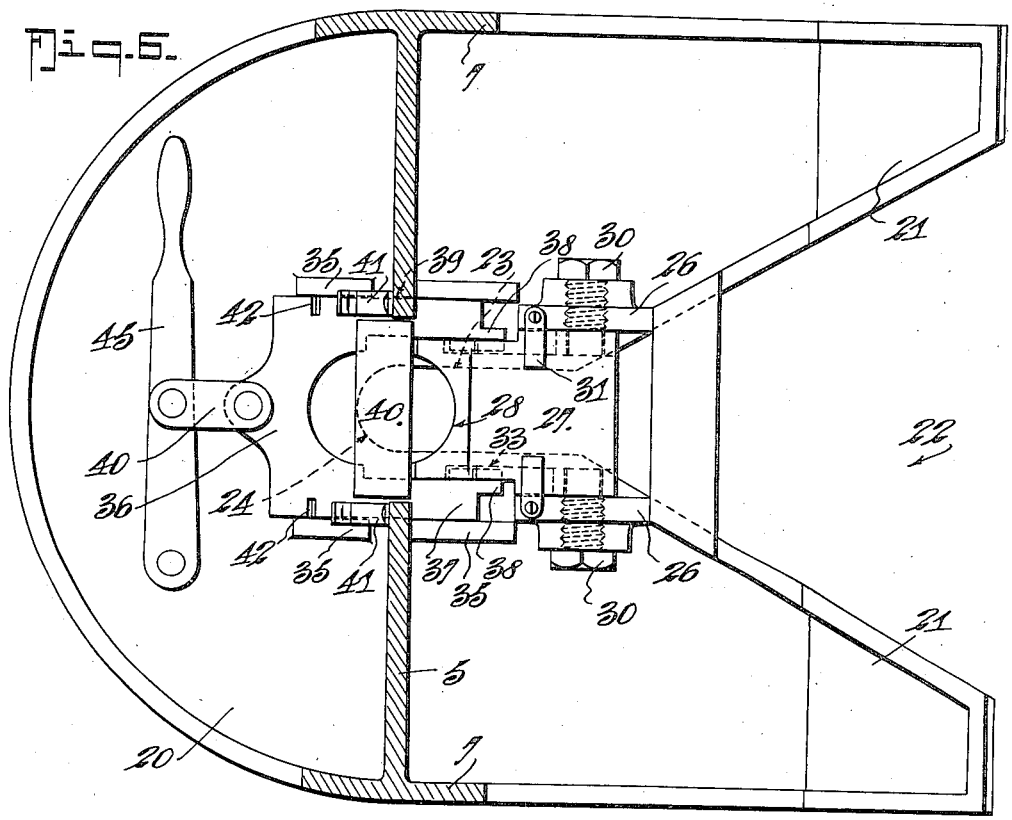
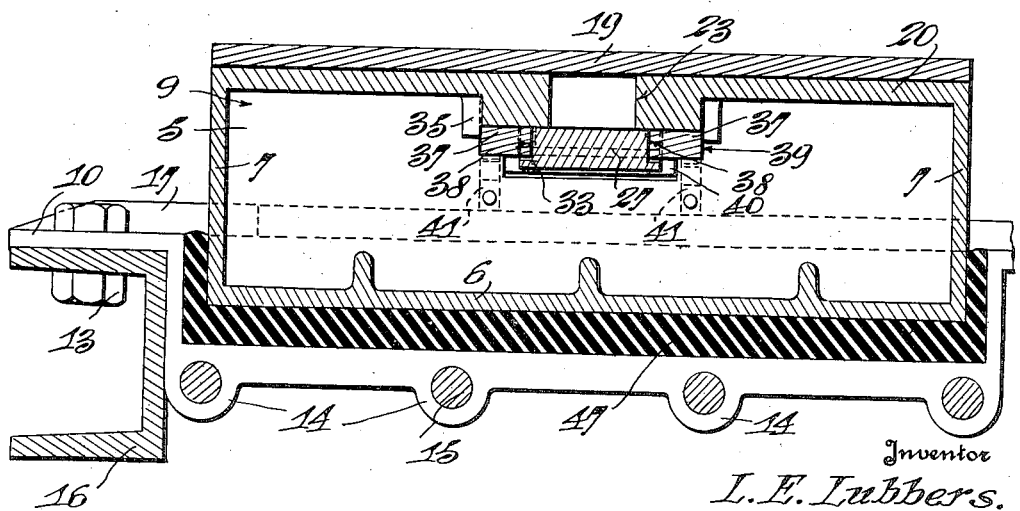
Inventor
L. E. Lubbers.
By Albert Dietrich
Attorney Patented July 19, 1932

1,867,670

UNITED STATES PATENT OFFICE

LUBBERT E. LUBBERS, OF STOUGHTON, WISCONSIN, ASSIGNOR TO THE STOUGHTON COMPANY, OF STOUGHTON, WISCONSIN, A CORPORATION OF WISCONSIN

FIFTH WHEEL

Application filed June 18, 1931. Serial No. 545,339.

My invention relates to certain new and useful improvements in fifth wheels for securing a semi-trailer to a tractor or other motor vehicle by means of which the semi-trailer is to be transported.

More especially the invention relates to systems of transporting heavy loads by motor vehicles, a system of the general kind disclosed in United States Letters Patent No. 1,084,820, issued January 20, 1914, to Theodore Pescatore.

Systems of the kind referred to comprise a fifth wheel embodying three essential factors, namely, first, provision in the nature of an inclined plane that automatically elevates the forward end of the trailer as the tractor is backed up to the same; secondly, the fifth wheel is so shaped that it will guide the front end of the hitch on the trailer into proper cooperative position and relation to the corresponding hitch on the tractor; and third, the provision of some device for holding the two hitches coupled together in a way that they may be uncoupled at the will of an attendant.

My invention, which embodies the same broad principles of the Pescatore patented apparatus, seeks to improve the same generally so as to obtain a more rugged and practical construction.

Further, the invention has for its object to provide a semi-trailer hitch which comprises a fifth wheel element or unit yieldably mounted on the tractor and provided with means to guide the coupling pin of a second fifth wheel unit carried by the semi-trailer, into place quickly and with least strain on the parts; also to provide a self-latching means for the coupling pin which engages a much larger surface of the coupling pin than heretofore; and also to provide a lever actuated locking device to cooperate with the latch to hold the fifth wheel elements locked together, the construction being such that the lever may be used to unlock the parts and release the latching means by one continuous movement of the lever.

Further, the invention has for its object to provide a fifth wheel structure wherein a much heavier pivot pin is employed than heretofore, and one in which the latching dog has a much larger surface to engage the pin than has been found possible heretofore, thereby obtaining the benefit of the full strength of the pin.

Further, it is an object to provide a fifth wheel structure of the type referred to wherein the latching dog is so pivoted that in releasing it the dog moves away from the pin in a manner so as not to bind, therefore obtaining the benefit of an easily dis-engageable means for holding the fifth wheel parts assembled.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation showing my invention in use.

Figure 2 is an enlarged central vertical section through the fifth wheel, the parts being in the position they assume when they are just about to go together, the dotted line position showing the parts actually together.

Figure 3 is a view similar to Figure 2 with the pin carrying part and its pin in coupled relation to the other unit, the latch being in the engaged locking position.

Figure 4 is a view similar to Figure 3 with the latch in its released position.

Figure 5 is a cross section on the line 5—5 of Figure 2 looking rearwardly.

Figure 6 is a horizontal section on the line 6—6 of Figure 3.

Figure 7 is a detail perspective view of the latch dog.

Figure 8 is a detail perspective view of the locking plate.

Figure 9 is a detail cross section on the line 9—9 of Figure 3.

Figure 10 is a detail perspective view of one end of the sectional boxing.

In the drawings in which like numerals of reference indicate like parts in all of the figures, 1 represents a semi-trailer, the draft beam 2 of which has a plate portion carrying a coupling pin 3 having a shank and a head 4.

The fifth wheel consists of two units, the upper unit including the pin 3 and the lower unit which will now be described. The lower unit includes a cross bracket which is adapted to be mounted on the chassis frame 16 or on any other suitable part of the tractor or other towing vehicle. This bracket consists of a transverse web 5, a base web 6 and end webs 7, the base web being provided if desired with holes 8 in order that when the bracket is embedded in cushion rubber 47 located in the sectional boxing 9, it will be interlocked with that rubber mechanically as well as by surface adhesion.

The sectional boxing 9 has ears 10 for bolting to the frame 16 of the tractor and it has a longitudinal opening 11 with T ends 12 to pass the webs 5 and 7 out of the boxing. The boxing is bolted to the frame by suitable bolts 13. The boxing also has suitably located lugs 14 having cross bolts 15 which secure the halves of the boxing together.

17 designates reinforcing beads around the opening 11—12 of the boxing.

18 indicates the tractor which may be of any approved construction and which carries the lower fifth wheel unit proper which includes a plate 20 firmly united with the cross bracket 5—7, etc. by welding or other suitable means. The plate 20 cooperates with the plate 19 of the upper fifth wheel unit (the plate 19 carrying the coupling pin 3).

The lower plate 20 has its end opposite the trailer downwardly inclined as at 21 so that when the plate 19 engages the incline, it will ride up onto the flat surface of the plate 20.

The plate 20 has a longitudinal blind end slot 23, the entrant portion 22 of which converges from the outer end of the plate inwardly to the straight portion 23 of the slot so as to direct the pin 3 into the straight part of the slot when the tractor is backed up to the trailer for coupling purposes.

Suitable reinforcing webs are provided on the under side of the plate 20 and adjacent the place where the flared part 22 of the slot in the lower plate meets the straight part 23, and there is located on the under side of the plate ears 26 which carry the pivot pintles 30 of the latch dog 27.

The blind end of the slot in the lower plate is concaved as at 24 to form a seat for the shank of the coupling pin and the latch has its end, which opposes the concavity 24, similarly concaved as at 28, thereby forming a pair of fingers 32, the purpose of which will later be explained.

The latch dog 27 has ears 29 extending upwardly toward the plate 20 so as to space the body of the latch from the plate and enable the head 4 of the pin 3 to clear it when the parts are being coupled. The latch has its fingers 32 held up into contact with the under part of the plate 20 by means of suitable springs 31, the construction being such that when the latch is in the up position and the parts are coupled together the concaved end 28 of the latch will engage the rear side of the head 4 of the pin 3 and prevent the parts becoming uncoupled.

The latch fingers have recesses 33 in their sides providing camming portions 34 for cooperation with the cams 38 of the fingers 37 of the locking plate 36, the locking plate being mounted in suitable guides 35 beneath the plate 20.

The web has a cut-out portion 39 which serves to permit passage of the locking plate and also acts as a guide or bearing therefor. The locking plate carries a bridge piece 40 across its fingers which, when the locking plate is in its locking position, underlies the fingers of the latch dog 32 and prevents movement of the latch dog on its pivot. The latching plate is also provided with a series of notches 42, 43, and 44 for cooperation with a retaining spring finger 41 to hold the latching plate in either of its three positions of adjustment.

The locking plate is moved by means of a suitable lever 45 that extends to a convenient place of operation by an attendant and is linked as at 46 to the plate 36.

The manner in which my invention operates will be now explained.

Assume that it is desired to couple the tractor to a semi-trailer. The lever 45 is manipulated to move the locking plate to a position where the holding spring finger 41 will engage the notch 43. At that time the locking bridge plate 36 is just clear of the front edges of the fingers of the locking dog. The cams 38 lie in the deepest part of the recesses 33 and hence do not effect the action of the latching dog. The tractor is now backed up to the trailer until the pin 3 enters the longitudinal slot of the lower unit. As the head of the pin engages the free portion of the locking dog it will depress the locking dog and slide over the free end until the shank of the pin engages with the concaved seat, at which time the head of the pin will have cleared the free end of the locking dog and it will spring up to its retaining position with its concavity 28 in alignment with the head of the pin. Thus any attempt to separate the trailer and tractor would be resisted by the latching dog. Having brought the two vehicles together as just explained, the operator then moves the lever 45 to bring the finger 41 into the notch 42. In doing this the bridge piece 40 is brought under the fingers of the locking dog so that the locking dog can no longer be depressed. Thus the parts are locked against accidental disconnection.

Now, when it is desired to uncouple the vehicles the attendant moves the lever 45 forwardly to bring the locking plate with its notch 44 into relation with the holding finger 41. In moving to this position the cams 38 will engage the camming faces 34 and depress the free end of the locking dog below the plane of the head 4 of the pin 3, leaving the coupling pin free to be withdrawn from the slot of the lower unit which occurs when the tractor is now moved forwardly from the trailer, or the trailer is moved rearwardly from the tractor. Having separated the vehicles the attendant then moves the locking plate until the finger 41 enters the notch 43 when the parts will be re-set to enable an automatic coupling of the vehicles again.

It should be understood that one or more springs 31 may be employed and one or more sets of notches 42, 43, and 44 and holding spring fingers 41 may be used if desired.

In the accompanying drawings and in the foregoing description I have endeavored to illustrate a preferred embodiment of my invention. I wish it understood, however, that changes in the details of construction, arrangement and design of parts may readily be made without departing from the spirit of the invention or the scope of the appended claims.

In this application I make no claim to the means per se for mounting the fifth wheel proper on the vehicle as that constitutes the subject matter of another application filed on the 22nd day of October, 1931, Serial No. 570,484.

What I claim is:

1. In fifth wheels, a lower unit and an upper unit, said upper unit including a body carrying a pivot pin which has a shank and a head, said lower unit including a plate having a slot to receive the shank of said pin, a dog pivoted beneath the lower plate to engage behind the pin head when the upper and lower units have been assembled, and means cooperative with said dog for locking the dog against movement when said means is in one position and for holding said dog set for automatically engaging said pin head as the units are being connected, when said means is in another position, and for releasing and holding said dog out of action when said means is in a third position.

2. In fifth wheels, a lower unit and an upper unit, said upper unit including a body carrying a pivot pin which has a shank and a head, said lower unit including a plate having a slot to receive the shank of said pin, a dog pivoted beneath the lower plate to engage behind the pin head when the upper and lower units have been assembled, and means cooperative with said dog for locking the dog against movement when said means is in one position and for holding said dog set for automatically engaging said pin head as the units are being connected, when said means is in another position, and for releasing and holding said dog out of action when said means is in a third position, said means including a locking plate having camming devices cooperating with complementary camming devices on said dog, and means for actuating said locking plate.

3. In fifth wheels, a lower unit and an upper unit, said upper unit including a body carrying a pivot pin which has a shank and a head, said lower unit including a plate having a slot to receive the shank of said pin, a dog pivoted beneath the lower plate to engage behind the pin head when the upper and lower units have been assembled, and means cooperative with said dog for locking the dog against movement when said means is in one position and for holding said dog set for automatically engaging said pin head as the units are being connected, when said means is in another position, and for releasing and holding said dog out of action when said means is in a third position, and means continuously tending to move said dog to its latch-holding position.

4. In fifth wheels, a lower unit and an upper unit, said upper unit including a body carrying a pivot pin which has a shank and a head, said lower unit including a plate having a slot to receive the shank of said pin, a dog pivoted beneath the lower plate to engage behind the pin head when the upper and lower units have been assembled, means cooperative with said dog for locking the dog against movement when said means is in one position and for holding said dog set for automatically engaging said pin head as the units are being connected, when said means is in another position, and for releasing and holding said dog out of action when said means is in a third position, said means including a locking plate having camming devices cooperating with complementary camming devices on said dog, and means for actuating said locking plate, and means continuously tending to move said dog to its latch-holding position.

5. In fifth wheels, a lower unit and an upper unit, said upper unit including a body carrying a pivot pin which has a shank and a head, said lower unit including a plate having a slot to receive the shank of said pin, a dog pivoted beneath the lower plate to engage behind the pin head when the upper and lower units have been assembled, and means cooperative with said dog for locking the dog against movement when said means is in one position and for holding said dog set for automatically engaging said pin head as the units are being connected, when said means is in another position, and for releasing and holding said dog out of action when said means is in a third position, and a spring latch device for holding said locking plate in either of its positions.

6. In fifth wheels, a lower unit and an upper unit, said upper unit including a body carrying a pivot pin which has a shank and a head, said lower unit including a plate having a slot to receive the shank of said pin, a dog pivoted beneath the lower plate to engage behind the pin head when the upper and lower units have been assembled, and means cooperative with said dog for locking the dog against movement when said means is in one position and for holding said dog set for automatically engaging said pin head as the units are being connected, when said means is in another position, and for releasing and holding said dog out of action when said means is in a third position, said means including a locking plate having camming devices cooperating with complementary camming devices on said dog, means for actuating said locking plate, and a spring latch device for holding said locking plate in either of its positions.

7. In fifth wheels, a lower unit and an upper unit, said upper unit including a body carrying a pivot pin which has a shank and a head, said lower unit including a plate having a slot to receive the shank of said pin, a dog pivoted beneath the lower plate to engage behind the pin head when the upper and lower units have been assembled, and means cooperative with said dog for locking the dog against movement when said means is in one position and for holding said dog set for automatically engaging said pin head as the units are being connected, when said means is in another position, and for releasing and holding said dog out of action when said means is in a third position, and means continuously tending to move said dog to its pin-holding position, and a spring latch device for holding said locking plate in either of its positions.

8. In fifth wheels, a lower unit and an upper unit, said upper unit including a body carrying a pivot pin which has a shank and a head, said lower unit including a plate having a slot to receive the shank of said pin, a dog pivoted beneath the lower plate to engage behind the pin head when the upper and lower units have been assembled, means cooperative with said dog for locking the dog against movement when said means is in one position and for holding said dog set for automatically engaging said pin head as the units are being connected, when said means is in another position, and for releasing and holding said dog out of action when said means is in a third position, said means including a locking plate having camming devices cooperating with complementary camming devices on said dog, and means for actuating said locking plate, means continuously tending to move said dog to its pin-holding position, and a spring latch device for holding said locking plate in either of its positions.

9. In fifth wheels, a lower and an upper unit, means to mount said units one on a towing vehicle and the other on a towed vehicle, said upper unit comprising a plate and a coupling pin having a shank and a head, said lower unit including a plate having an inclined end to cooperate with the plate of the other unit, said lower unit's plate also having a longitudinal blind end slot to receive the shank of said pin, ears on said lower unit's plate beneath the same and at either side of said longitudinal slot, a dog pivoted between said ears to lie beneath the plate and having its free end formed to engage the head of said pin when said pin is in the blind end of said slot, thereby serving as a retaining means, means yieldably holding said dog in its pin retaining position, and a combined dog locking and unlocking and dog displacing means mounted on said lower unit's plate and cooperatively associated with said dog whereby when said combined means is in one position it will hold said dog immovable and when it is in another position it will free said dog for movement, and when in a third position it will hold said dog out of its operative position.

10. In fifth wheels, a lower and an upper unit, means to mount said units one on a towing vehicle and the other on a towed vehicle, said upper unit comprising a plate and a coupling pin having a shank and a head, said lower unit including a plate having an inclined end to cooperate with the plate of the other unit, said lower unit's plate also having a longitudinal blind end slot to receive the shank of said pin, the entrant end of said slot being flared, ears on said lower unit's plate beneath the same and at either side of said longitudinal slot, a dog pivoted between said ears to lie beneath the plate and having its free end formed to engage the head of said pin when said pin is in the blind end of said slot, thereby serving as a retaining means, means yieldably holding said dog in its pin retaining position, and a combined dog locking and unlocking and dog displacing means mounted on said lower unit's plate and cooperatively associated with said dog whereby when said combined means is in one position it will hold said dog immovable and when it is in another position it will free said dog for movement, and when in a third position it will hold said dog out of its operative position.

11. In fifth wheels, a lower and an upper unit, means to mount said units one on a towing vehicle and the other on a towed vehicle, said upper unit comprising a plate and a coupling pin having a shank and a head, said lower unit including a plate having an inclined end to cooperate with the plate of the other unit, said lower unit's plate also having a longitudinal blind end slot to receive the shank of said pin, the entrant end of said slot being flared, ears on said lower unit's plate beneath the same and at either side of said longitudinal slot, a dog pivoted between said ears to lie beneath the plate and having its free end formed to engage the head of said pin when said pin is in the blind end of said slot, thereby serving as a retaining means, means yieldably holding said dog in its pin retaining position, and a combined dog locking and unlocking and dog displacing means mounted on said lower unit's plate and cooperatively associated with said dog whereby when said combined means is in one position it will hold said dog immovable and when it is in another position it will free said dog for movement, and when in a third position it will hold said dog out of its operative position, said ears being located approximately at the juncture of the straight part of the slot with the flared part thereof, and said dog being directed toward the blind end of said slot.

12. In fifth wheels, a lower and an upper unit, means to mount said units one on a towing vehicle and the other on a towed vehicle, said upper unit comprising a plate and a coupling pin having a shank and a head, said lower unit including a plate having an inclined end to cooperate with the plate of the other unit, said lower unit's plate also having a longitudinal blind end slot to receive the shank of said pin, the entrant end of said slot being flared, ears on said lower unit's plate beneath the same and at either side of said longitudinal slot, a dog pivoted between said ears to lie beneath the plate and having its free end formed to engage the head of said pin when said pin is in the blind end of said slot, thereby serving as a retaining means, means yieldably holding said dog in its pin retaining position, and a combined dog locking and unlocking and dog displacing means mounted on said lower unit's plate and cooperatively associated with said dog whereby when said combined means is in one position it will hold said dog immovable and when it is in another position it will free said dog for movement, and when in a third position it will hold said dog out of its operative position, said ears being located approximately at the juncture of the straight part of the slot with the flared part thereof, and said dog being directed toward the blind end of said slot, said combined means including a sliding device having provisions to underlie the free end of said dog when in its holding position for locking it there, and having other provisions to overlie said dog and move it out of its locking position.

LUBBERT E. LUBBERS.